United States Patent

Ishihara

[11] Patent Number: 6,034,590
[45] Date of Patent: Mar. 7, 2000

[54] SENSOR

[75] Inventor: Kanji Ishihara, Miyagi-ken, Japan

[73] Assignee: Alps Electric Co., Ltd., Tokyo, Japan

[21] Appl. No.: 09/148,022

[22] Filed: Sep. 3, 1998

[30] Foreign Application Priority Data

Sep. 5, 1997 [JP] Japan .................................. 9-240539

[51] Int. Cl.[7] .................................................. H01C 10/44
[52] U.S. Cl. .......................................... 338/183; 338/176
[58] Field of Search ............................. 137/554; 338/176, 338/183, 184, 199

[56] References Cited

U.S. PATENT DOCUMENTS

| | | | |
|---|---|---|---|
| 2,900,615 | 8/1959 | Gottschall et al. | 338/176 |
| 2,909,750 | 10/1959 | Pitzer | 338/176 |
| 3,185,949 | 5/1965 | Jordan | 338/176 X |
| 4,213,112 | 7/1980 | Alman et al. | 338/183 |
| 4,284,969 | 8/1981 | Carbonneau | 338/183 |
| 4,583,032 | 4/1986 | Nunziata et al. | 338/176 X |
| 4,862,982 | 9/1989 | Saito et al. | 338/176 X |
| 4,894,638 | 1/1990 | Flierl et al. | 338/184 X |
| 5,345,215 | 9/1994 | Okumura et al. | |

*Primary Examiner*—John Rivell
*Attorney, Agent, or Firm*—Brinks Hofer Gilson & Lione

[57] ABSTRACT

A sensor comprises a casing closed with a cover having a bearing section; an axially movable operating shaft supported on the bearing section; and a slider receiver in contact with the forward end of the operating shaft within the casing. A first return spring in elastic contact with the operating shaft and the second return spring in elastic contact with the slider receiver are disposed within the casing.

5 Claims, 7 Drawing Sheets

SENSOR

BACKGROUND OF THE INVENTION

1. Field of the Invention

The present invention relates to a variable resistor for a valve opening control sensor of an EGR device of an automobile and an EGR sensor for controlling an air-gasoline mixing ratio, and an encoder to be used as various types of sensors.

2. Description of the Prior Art

A prior art sensor of this type will be explained with reference to a sectional view of FIG. 10. The prior art sensor comprises a casing 1 which forms an outer shell; an operating shaft 2 which is movable from side to side in the drawing with respect to the casing 1; an insulating substrate 3 built in the casing 1; a slider piece 4 which slides in contact with an unillustrated conductive pattern of a resistor and a current collector mounted on the upper surface of the insulating substrate 3; a slider receiver 5 for storing the slider piece 4; a return spring 6 disposed offset from the axis of the operating shaft 2 for applying a spring force to the slider receiver 5; and an external terminal 7 connected to the resistor substrate 3.

In a bearing 1a mounted in one end of the casing 1 the operating shaft 2 is inserted and supported. At the opening 1b provided in the other end a cover 8 is mounted to close the opening. In the opposite inner wall of the casing 1 a pair of guide grooves (not shown) are formed extending in a direction parallel with the axis of the operating shaft 2. A pair of protrusions 5a formed on the slider receiver 5 is engaged with the guide grooves to thereby guide the movement of the slider receiver 5.

The insulating substrate 3 provided within the casing 1 is engaged at both ends in a pair of grooves (not shown) formed in the opposite inner wall of the casing 1. The insulating substrate 3 is pressed to the slider receiver 5 side by a wavy plate spring 9 disposed between the casing 1 and the back side of the insulating substrate 3, thereby being attached in the pair of grooves.

On one end side of the insulating substrate 3 is formed a terminal portion 3a which has an unillustrated terminal pattern of a conductor connected to a resistor and a current collector. Also on one end side of the external terminal 7 a connecting portion 7a is formed. The terminal portion 3a of the insulating substrate 3 and the connecting portion 7a of the external terminal 7 are both disposed on the opening 1b side and are mutually connected at a clip terminal 10. In the casing 1 is formed a groove 11 in which the return spring 6 is mounted offset from the axis of the operating shaft 2, so that the return spring 6 disposed in the groove 11 will elastically press the slider receiver 5 in the axial direction.

Also a protrusion 2a is formed on the operating shaft 2 positioned within the casing 1; with the protrusion 2a held in contact with the bottom surface of a recess 5b provided in the slider receiver 5, the slider receiver 5 elastically presses the operating shaft 2 by the spring force of the return spring 6 towards the arrow G side.

Figure 10:
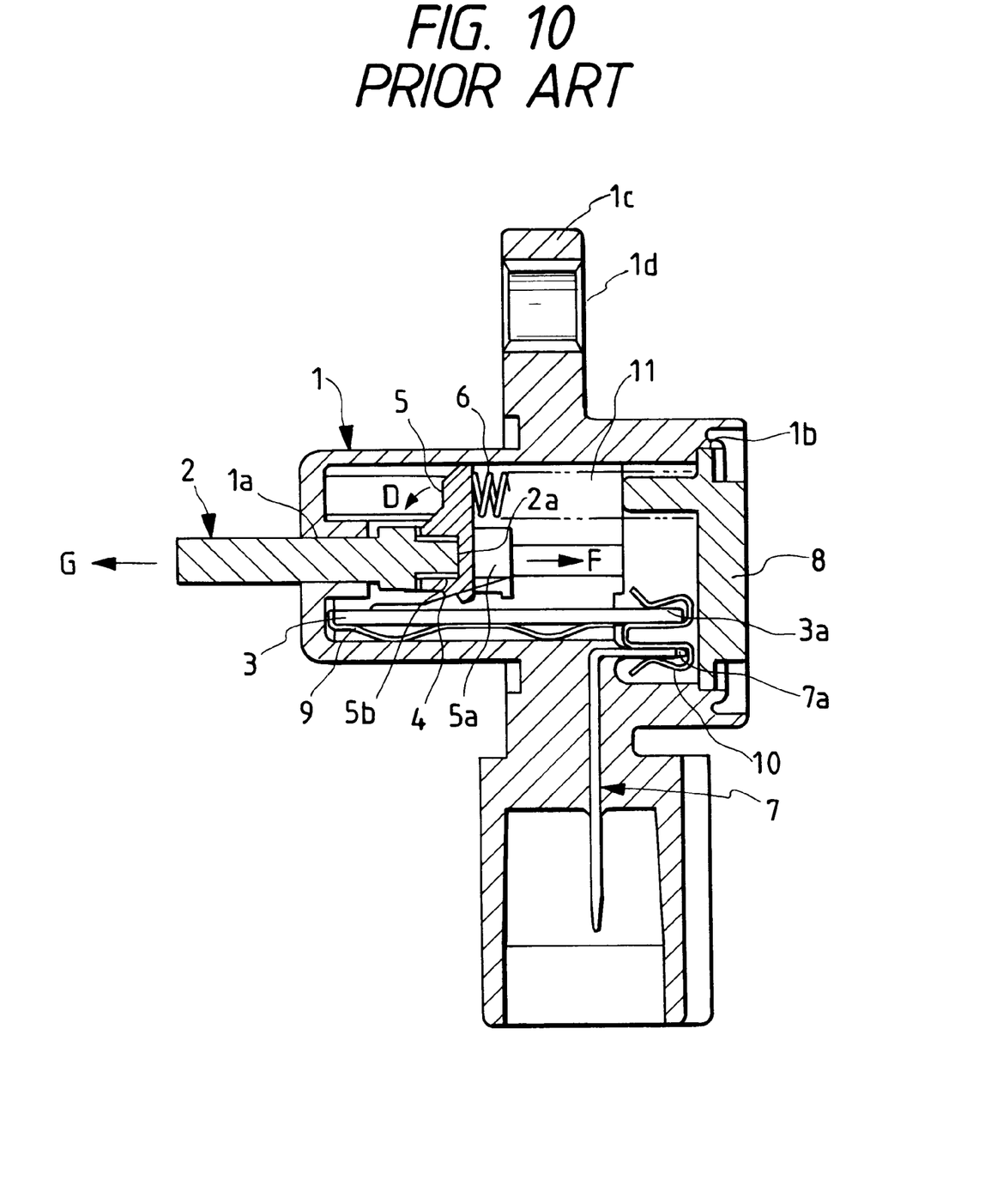
FIG. 10 is a sectional view of a major portion of a prior art sensor.

The return spring 6 elastically presses the slider receiver 5 in a position offset from the axial center of the operating shaft 2, and therefore the slider receiver 5 is constantly exerted with a force in the direction of the arrow D shown in FIG. 10 to thereby rotate on a portion which the protrusion 2a of the operating shaft 2 contacts as a fulcrum.

The pair of protrusions 5a formed on the slider receiver 5 have a tapered surface on the illustrated lower surface side;

2 and the pair of guide grooves provided in the case 1 for guiding the protrusion 5a are also so formed as to be in contact with the tapered surface. Therefore, since the slider receiver 5 is hard to move if added with vibration, the pair of guide grooves can come into contact with the tapered surface with stability.

Furthermore, a mounting hole 1d is formed in the mounting portion 1c provided outside of the casing 1, for thereby mounting the sensor on another device.

The prior art sensor of the above-described constitution is mounted in a control valve housing 12 in an unillustrated EGR device for reducing nitrogen oxides included in exhaust gases from the automotive engine.

Figure 11:
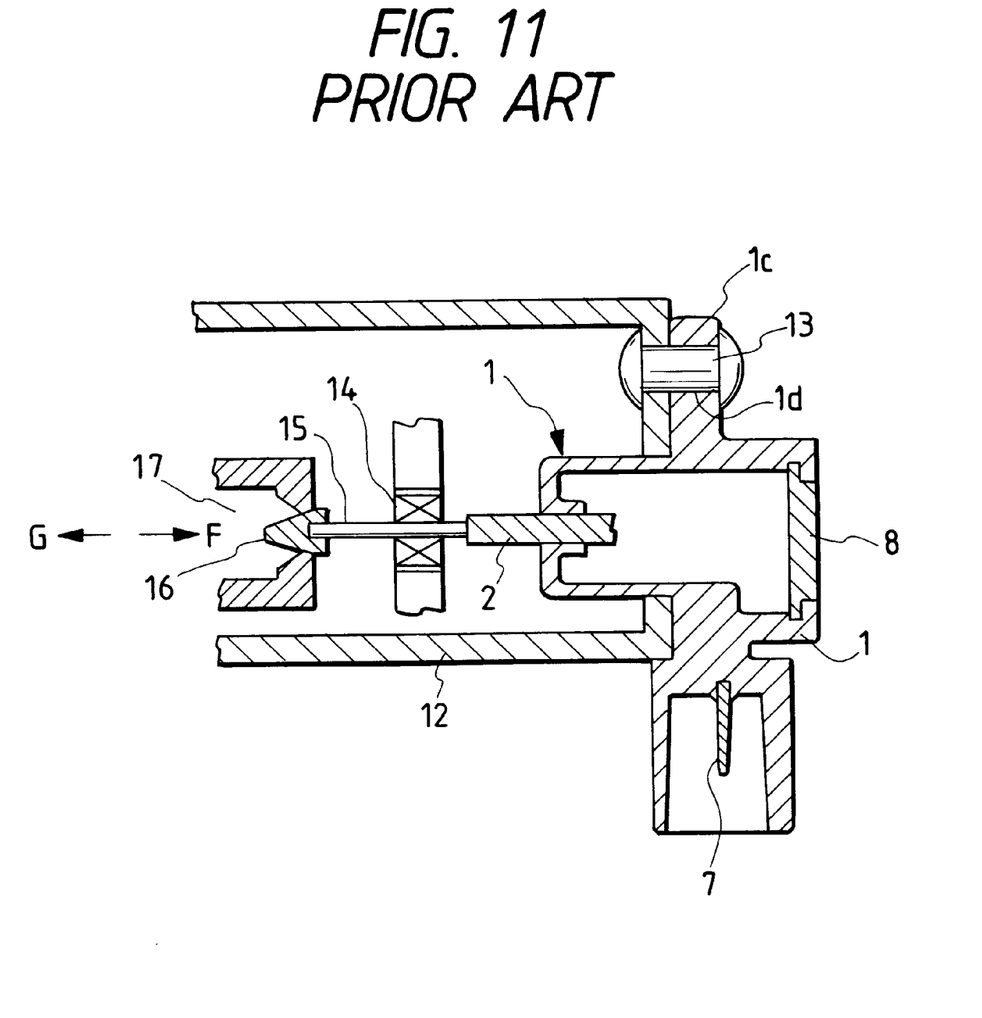
FIG. 11 is a schematic view explaining the use of the prior art sensor.

Within the control valve casing 12, as shown in FIG. 11, a valve rod 15 which moves in a direction parallel with the axis of the operating shaft 2 when the solenoid 14 is energized; on one end of the valve rod 15 a control valve 16 is mounted. The control valve 16 is mounted in the casing 12 in such a manner that it can open and close the exhaust gas return port 17.

The control valve 16 is mounted as a valve opening sensor which senses the amount of opening of the exhaust gas return port 17, by a mounting member 13 in the control valve casing 12.

When the valve rod 15 of the control valve 16 is moved by control of the solenoid 14 in the direction of the arrow F in which the exhaust gas return port 17 is opened, the valve rod 15 pushes the operating shaft 2 which protrudes out of the casing 1, to thereby move the operating shaft 2 towards the inside of the casing 1.

At this time, the protrusion 2a of the operating shaft 2 which is in contact with the bottom surface of the recess 5b of the slider receiver 5 in the casing 1 shown in FIG. 10 pushes the slider receiver 5 to move the slider receiver 5 and the operating shaft 2 in the direction of the arrow F in the casing 1 against the spring force of the return spring 6.

Then, the slider piece 4 sliding in contact with the insulating substrate 3 also moves with the movement of the slider receiver 5, thereby changing the resistance value of the sensor.

The sensor is of such a constitution that as the valve rod 15 moves in the direction of the arrow G in which the exhaust gas return port 17 is closed by the control valve 16, the operating shaft 2 and the slider receiver 4 are also moved towards the arrow G side with the spring force of the return spring 6.

If, however, the current being supplied to the solenoid 14 is cut off because of certain circumstances, the solenoid 14 will fail to control the movement of the valve rod 15, and accordingly the valve rod 15 will become freely movable in the directions of the arrows F and G.

When external vibration is applied to the EGR device under the above-described condition, the spring force of the return spring 6 elastically exerted to the operating shaft 2 which is in contact with the valve rod 15 can not restrict movement of the valve rod; in this state, the valve rod 15 is freely movable in the directions of the arrows F and G. Thus the slider receiver 5 also freely moves with the movement of the valve rod 15, accelerating wear of the slider piece 4 and accordingly resulting in shortened sensor life.

To solve the above-described problem of the prior art sensor, the movement of the valve rod 15 must be restricted even when the current supply to the solenoid 14 is cut off.

In the prior art sensor, therefore, a conceivable means for solving the above-described problem is to increase the spring force of the return spring 6 to provide a greater force for operating the operating shaft 2. Simply increasing the spring force of the return spring 6, however, increases a force to turn the slider receiver 5 to the direction of the arrow D; accordingly the slider receiver 5 will fail to smoothly move within the casing 1, resulting in poor controllability.

SUMMARY OF THE INVENTION

It is an object of the present invention to provide a sensor which can restrict free movement of the valve rod 15 by pressing the valve rod 15 with a greater force than the spring force of the return spring 6 if the spring force is not increased, for instance if the current supply to the solenoid 14 is cut off and a force to freely move the valve rod 15 in the directions of the arrows F and G is applied.

As a first means for solving the above-described problem, the sensor of the present invention comprises a casing having an opening, a cover for closing the opening, a bearing section provided in the cover or the casing, an operating shaft supported on the bearing section and movable in an axis direction, and a slider receiver which is in contact with the operating shaft located within the casing and is movable in a direction parallel with the axis of the operating shaft in interlock with the movement of the operating shaft; and a first return spring which is in elastic contact with the operating shaft and a second return spring which is also in elastic contact with the slider receiver are disposed within the casing.

Furthermore, as a second means for solving the above-described problem, there is formed, in the casing, a spring storing section for storing the first return spring in a position equidistant from the axial center of the operating shaft. On the operating shaft a pair of arm portions are formed extending in a direction orthogonal with the axis of the operating shaft into elastic contact with the first return spring.

Furthermore, as a third means for solving the above-described problem, a spring retaining portion is formed in a part of the pair of arm portions in elastic contact with the first return spring, and the end of the first return spring is retained at the spring retaining portion.

Furthermore, as a fourth means for solving the above-described problem, a guide section for guiding the movement of the operating shaft is formed within the casing, and the arm portion and/or the spring retaining portion of the operation shaft are positioned in the guide section.

Furthermore, as a fifth means for solving the above-described problem, the spring retaining portion of the operating shaft is formed in the shape of a cross, and is positioned in a cruciform guide section formed in one unit with the spring storing section of the casing.

DESCRIPTION OF THE PREFERRED EMBODIMENTS

Figure 1:
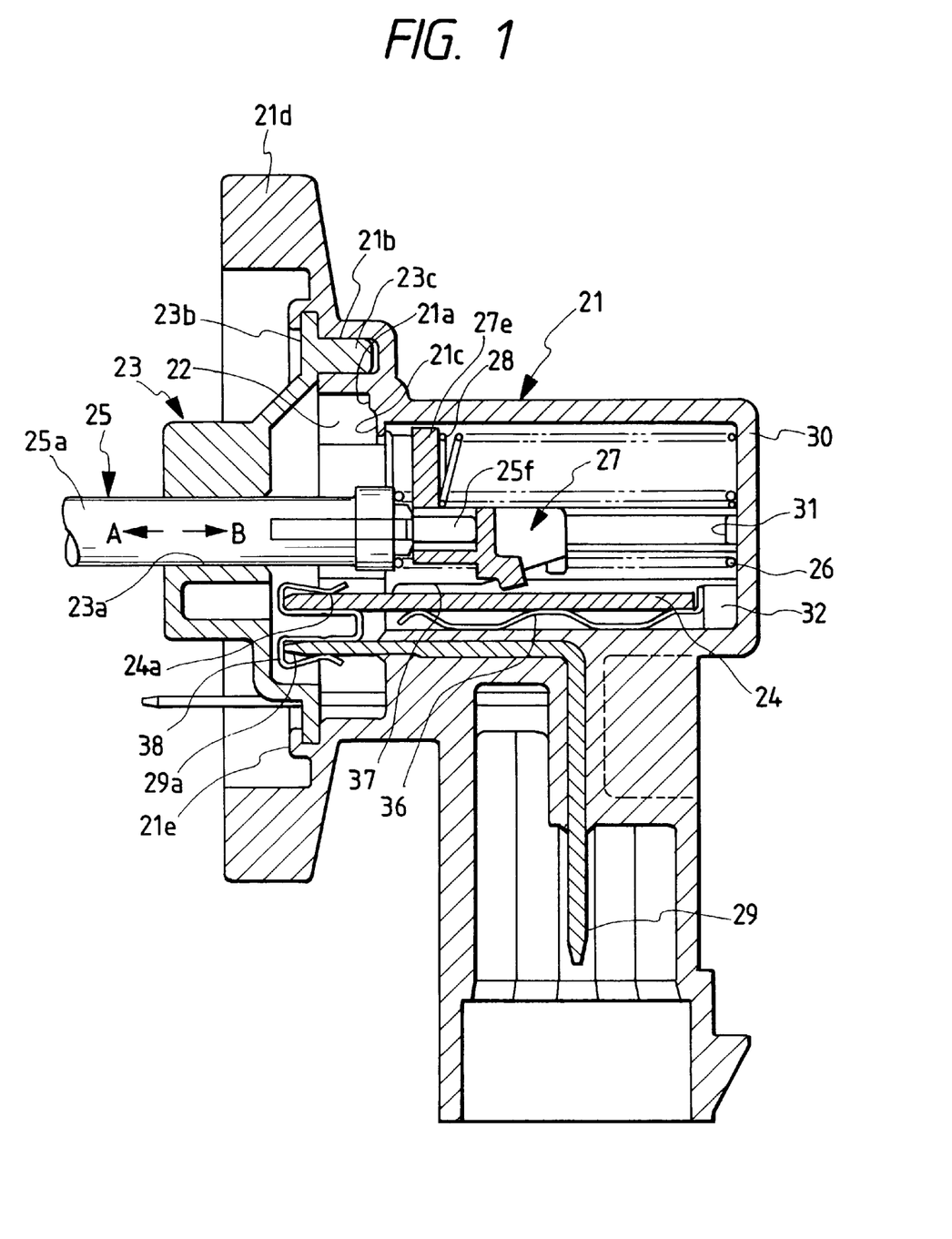
FIG. 1 is a longitudinal sectional view of a major portion of a sensor according to the present invention.
Figure 2:
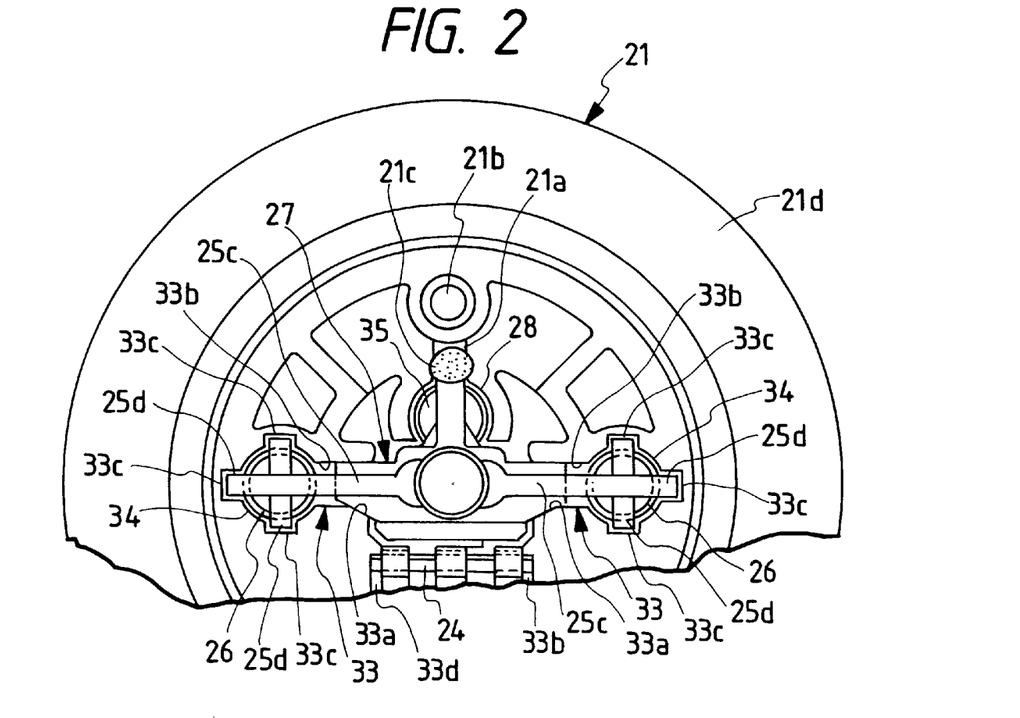
FIG. 2 is a schematic plan view of the sensor with a cover of FIG. 1 removed.
Figure 3:
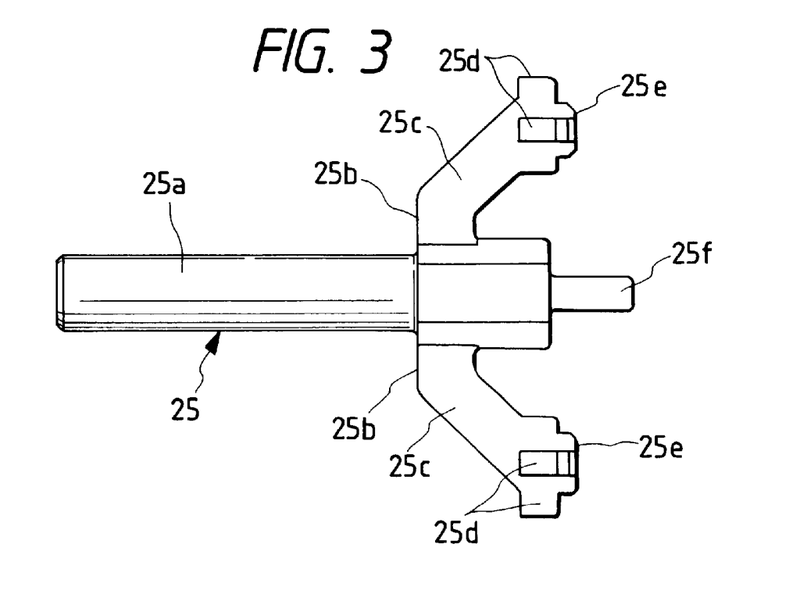
FIG. 3 is a front view of an operating shaft used in the sensor of the present invention.
Figure 4:
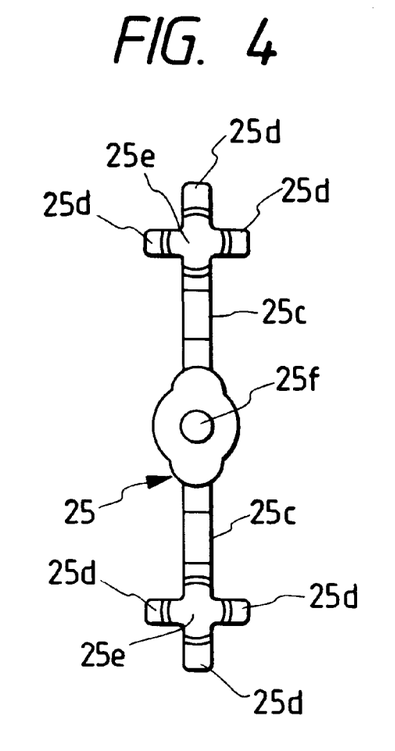
FIG. 4 is a side view of FIG. 3.
Figure 5:
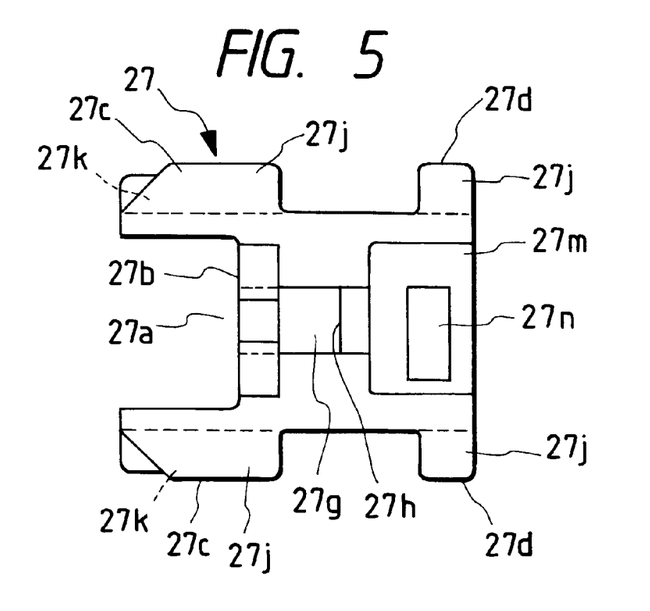
FIG. 5 is a front view of a slider receiver used in the sensor of the present invention.
Figure 6:
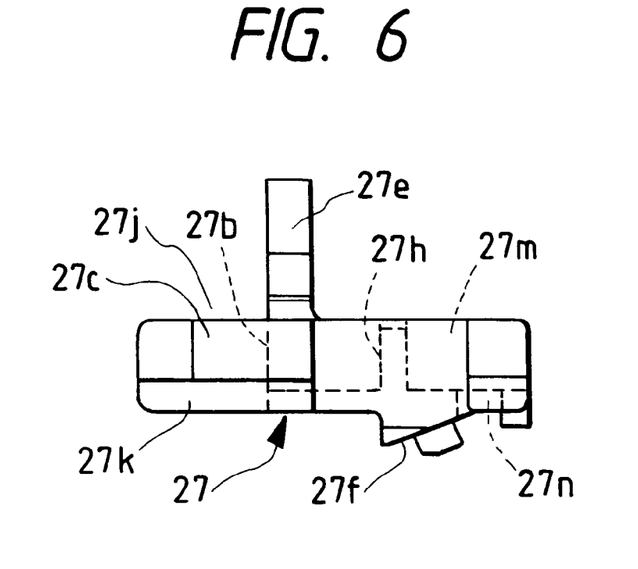
FIG. 6 is a side view of FIG. 5.
Figure 7:
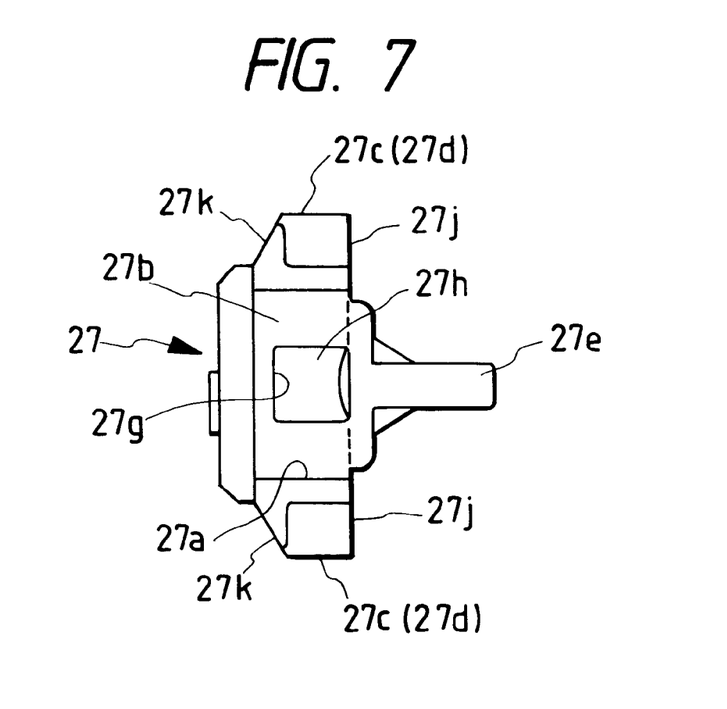
FIG. 7 is a plan view of FIG. 5.
Figure 8:
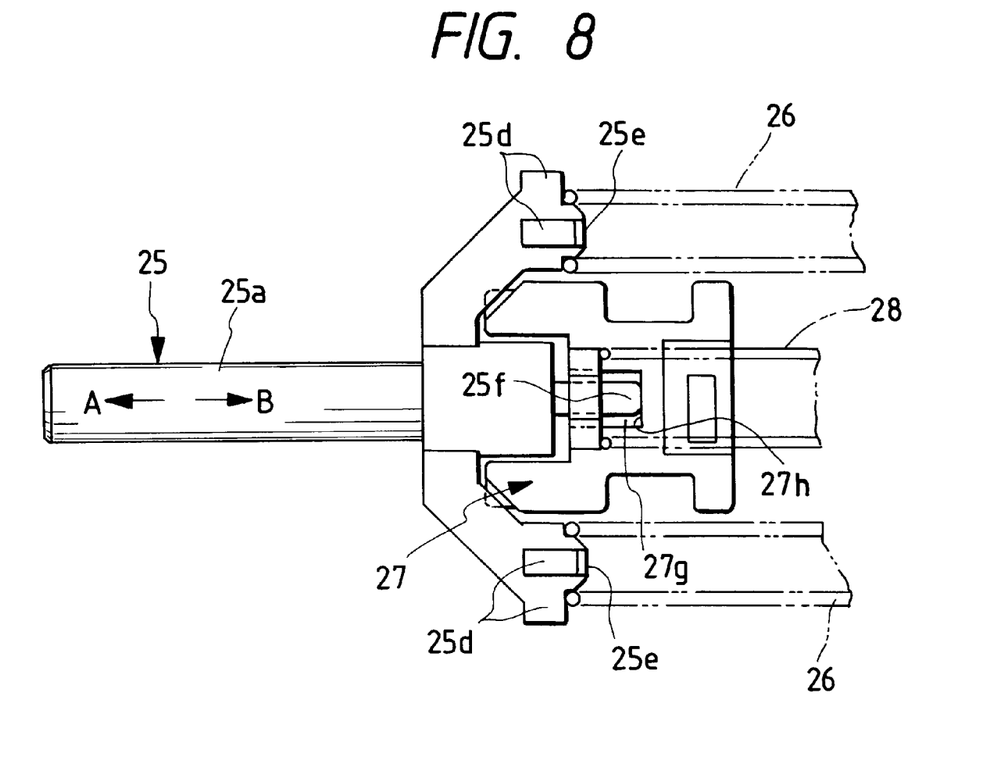
FIG. 8 is a schematic front view explaining a relation between the operating shaft and slider receiver of the sensor of the present invention.
Figure 9:
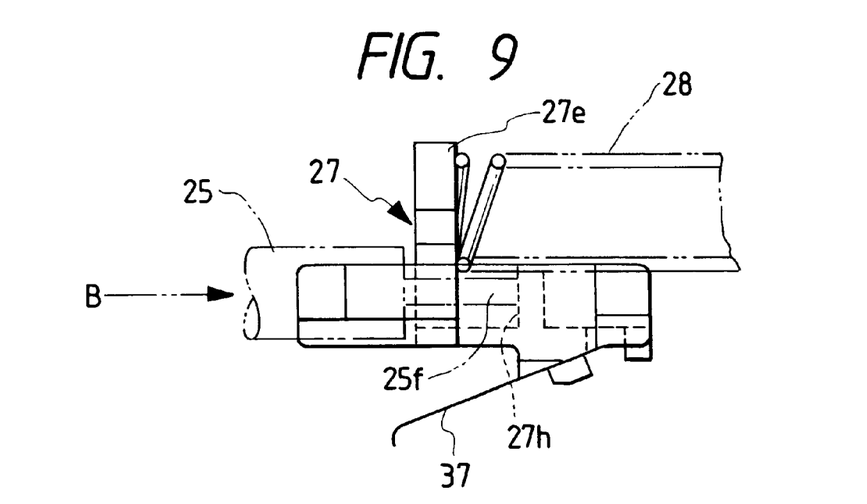
FIG. 9 is a schematic side view explaining operation of the slider receiver of the sensor of the present invention.

Embodiments of a sensor according to the present invention will hereinafter be explained with reference to FIGS. 1 to 9. FIG. 1 is a longitudinal sectional view taken in the direction of the axis of an operating shaft of the sensor of the embodiment according to the present invention; FIG. 2 is a schematic plan view showing the interior of the casing in FIG. 1; FIGS. 3 and 4 are front and side views of the operating shaft; FIGS. 5, 6 and 7 are front view, side view, and plan view respectively of the slider receiver; FIG. 8 is a schematic front view explaining a relation between the operating shaft and the slider receiver; and FIG. 9 is a schematic side view explaining operation of the slider receiver.

The sensor of the present invention, as shown in FIGS. 1 and 2, comprises mainly a bottomed casing 21, a cover 23 which has a bearing section 23a and covers the opening 22 of the casing 21, an insulating substrate 24 mounted within the casing 21, an operating shaft 25, a first return spring 26 for elastically pressing the operating shaft 25 in the axial direction, a slider receiver 27 which is in contact with the forward end portion of the operating shaft 25 positioned within the casing 21 and is movable in the axial direction of the operating shaft 25, a second return spring 28 for elastically pressing the slider receiver 27 in the axial direction, and an external terminal retained within the casing 21.

The casing 21 is produced of a synthetic resin and has a bottom 30 on one side and an opening 22 on the other side. In the casing 21, a pair of stoppers 31 are protrusively formed on the inner surface of the bottom 30 to restrict the movement of the slider receiver 27; and furthermore a pair of positioning protrusions 32 are formed for positioning the insulating substrate 24.

At the central part of the casing 21 a guide groove 33 is formed laterally as shown in FIG. 2, extending deep from the opening 22 side to the bottom 30. In the guide groove 33 the slider receiver 27 and the operating shaft 25 are inserted movable in the axial direction of the operating shaft 25.

In the guide groove 33 a pair of tapered portions 33a and a pair of flat portions 33b are formed; the tapered portions 33a and the flat portions 33b function to guide the movement of the slider receiver 27.

At either of the right and left ends of the guide groove 33 in the drawing there is formed a round spring storing section 34 for storing the first return spring 26 in a position equidistant from the axial center of the operating shaft 25. The first return spring 26 stored in the spring storing section 34 is held in elastic contact with the operating shaft 25 to thereby elastically press the operating shaft 25 to the direction A in FIG. 8.

On the outer periphery side of the spring storing section 34, a cruciform guide section 33c formed in one unit with the spring storing section 34, so deep as to reach the bottom 30 to thereby guide the movement of the operating shaft 25 within the casing 21.

A little above the central part of the casing 21 in FIG. 2, a spring storing section 35 for storing the second return spring 28 in elastic contact with the slider receiver 27 is formed as far as the bottom 30.

Furthermore, above the spring storing section 35 in the drawing, there is formed a protrusion 21a protruding to the opening 22 side; and above the protrusion 21a is also formed a positioning hole 21b of specific depth and diameter for mounting the cover 23 in position.

On the protrusion 21a a caulking portion 21c is formed by heating to melt the surface resin at an elevated temperature and pressing the molten resin to protrude to the spring storing section 35 side. The caulking portion 21c serves to securely retain the slider receiver 27 so that the slider receiver 27 will never jump out of the guide groove 33 if applied with the spring force of the second return spring 28.

On the outer peripheral part of the opening 22 side of the casing 21 a visor-shaped collar 21d is formed.

The cover 23 for covering the opening 22 of the casing 21 is a disk-shaped cover made of a synthetic resin or the like, with the bearing section 23a formed through at the central part thereof through which the operating shaft 25 is inserted. Furthermore, on a collar 23b near the outer periphery of the cover 23 there are formed a plurality of protrusions 23c of specific height and diameter.

To attach the cover 23 to the casing 21, the protrusions are inserted into the positioning holes 21b of the casing 21 to thereby position the cover 23. Then a caulking portion 21e is heated at an elevated temperature to fixedly attach the cover to the casing 21, thus closing the opening 22 to hermetically close the interior of the casing 21.

On the surface of the insulating substrate 24 disposed in the casing 21 a resistor and a current collector (both not illustrated) are formed; and on one end side there is provided a terminal portion 24a on which an unillustrated terminal pattern of a conductor connected to the resistor and the current collector is formed.

The insulating substrate 24 is inserted in a substrate mounting groove 33d which is formed continuously to the guide groove 33 within the casing 21 shown in FIG. 2, with the other end positioned in contact with the positioning protrusion 32.

The insulating substrate 24 is elastically pressed against the slider receiver 27 side (the upper surface side in the drawing) by a wavy plate spring 36 inserted in between the back side of the insulating substrate 24 and the inner wall of the casing 21, and is mounted tight in the substrate mounting groove 33d.

The terminal portion 24a of the insulating substrate 25 is protruded out into the opening 22 of the casing 21.

The operating shaft 25, as shown in FIG. 3, is comprised of a knob portion 25a inserted in the bearing section 23a of the cover 23, and a pair of arms 25c having flat portions 25b on the right of the knob portion 25a in the drawing, extending to the obliquely right upper and right lower in a direction (vertical direction in the drawing) orthogonal with the axis of the operating shaft 25. The arm 25c is formed in a plate shape with its forward end portion in elastic contact with the first return spring 26 stored in the spring storing section 34.

On the pair of arms 25c is formed a spring retaining portion 25d in a part which the first return spring 26 elastically contacts. The spring retaining portion 25d is formed in a cruciform shape as shown in FIG. 4. At the central part of this cruciform spring retaining portion 25d a protrusion 25e is protrusively formed. Over the protrusion 25e the inner diameter of the first return spring 26 is inserted. The first return spring 26 is retained at the end on the spring retaining portion 25d so as to elastically contact the operating shaft 25, thereby constantly pressing the operating shaft 25 towards the arrow A shown in FIG. 1. The flat surface 25b of the operating shaft 25 is in contact with the bearing section 23a of the cover 23, so that the operating shaft 25 can be kept from slipping out of the casing 21.

The forward end portion 25f of the operating shaft 15 inserted in the casing 21 is formed thinner than the knob portion 25a as shown in FIG. 3 and protrudes out for a specific length from the spring retaining portion 25d.

Within the casing 21 is disposed the slider receiver 27 which comes into contact with the forward end portion 25f of the operating shaft 25 and is movable in the axial direction of the operating shaft 25 in interlock with the movement of the operating shaft 25.

The slider receiver 27 is formed of a synthetic resin, which will be explained with reference to the front view of FIG. 5, the side view of FIG. 6, and the plan view of FIG. 7.

The slider receiver 27, as shown in FIG. 5, is provided with an approximately U-shaped recess 27a having a bottom 27b at the left, central part in the drawing, with a pair of first guide sections 27c on both the upper and lower sides of the recess 27a in the drawing, and with a pair of second guide sections 27d on both the right upper and right lower sides in the drawing.

The first and second guides 27c and 27d, as shown in FIG. 7, are formed of a flat surface 27j and a tapered surface 27k. The flat surface 27j and the tapered surface 27k are guided by the tapered portion 33a and flat portion 33b of the guide groove 33 of the casing 21, thereby enabling smooth movement of the slider receiver 27 in the axial direction of the operating shaft 25.

In the right, central part shown in FIG. 5 a recessed portion 27m depressed to a specific depth is formed; and a square window 27n is formed through in the bottom surface of the recessed portion 27m.

Furthermore, as shown in FIG. 6, a square rod-shaped spring receiving portion 27e projecting in a direction intersecting the flat surface 27j at right angles is formed on the same plane as the bottom surface 27b of the recess 27a. And the second return spring 28 is in elastic contact with the spring receiving portion 27e.

On the same plane side as the tapered surface 27k, an inclined portion 27f inclined at a specific angle is formed on the right side shown in FIG. 6, so that a slider piece 37 described later will be mounted on the inclined portion 27f.

In the bottom surface 27b of the recess 27a of the slider receiver 27 a square hole 27g having a bottom surface 27h is formed to a specific depth as shown in FIG. 7. The forward end portion 25f of the operating shaft 25 is inserted in the square hole 27g. The end of the forward end portion 25f is in contact with the bottom surface 27h of the square hole 27g, so that the pressure of the operating shaft 25 may be received by the bottom surface 27h.

The inclined portion 27f is fitted with the slider piece 37 as shown in FIG. 9. The slider piece 37 is produced of a resilient metal plate. The slider piece 37 is designed to slide, in an elastic contact state, on the resistor, current collector, and resistor (not shown) on the insulating substrate 24 as shown in FIG. 1.

The external terminal 29 is retained on the casing 21 by such a means as an insert mold or other; one end thereof serves as a connecting portion 29a protruding into the opening 22 parallel with the terminal portion 24a of the insulating substrate 24, while the other end is bent to protrude to the side of the casing 21. The terminal portion 24a of the insulating substrate 24 and the connecting portion 29a of the external terminal 29 are mutually connected by such a connecting means as a clip terminal 38.

The terminal portion 29a and the connecting portion 24a can easily and firmly connected simply by inserting the clip terminal 38 into the terminal portion 29a and the connecting portion 24a.

Operation of the sensor of the above-described constitution according to the present invention will be explained.

First, the EGR device using the sensor of the present invention is of the same constitution as the prior art device and therefore sensor operation on the EGR device side will be explained with reference to FIG. 11.

When the valve rod 15 on the EGR device side is moved in the direction of the arrow F by the solenoid 14, the sensor operating shaft 25 of the present invention which is in contact with the valve rod 15 is positioned in the cruciform guide section 33c where the cruciform spring retaining portion 25d is formed continuously to the spring storing section 34 of the casing 21 and moves in the direction of the arrow B shown in FIG. 1 to thereby compress the first return spring 26.

Then, the forward end 25f of the operating shaft 25 pushes the bottom surface 27h of the square hold 27g of the slider receiver 27, and accordingly the slider receiver 27 is guided along the guide groove 33 of the casing 21, moving to the bottom 30 side of the casing 21 against the spring force of the second return spring 28.

At this time the guide groove 33 and the first and second guide sections 27c and 27d are provided with a slight clearance for convenience of movement, and the slider receiver 27 receives a spring force of the second return spring 28 to turn like in a conventional example, to thereby press the first guide section 27c against the tapered portion 33a. Therefore, the slider receiver 27 is guided by the tapered portion 33a, so that the slider receiver 27 becomes hard to move if added with external vibration. Thus the slider piece 37 comes into contact with the resistor with stability.

The first return springs 26, 26 and the second return spring 28 are of the same shape. The operating shaft 25 is exerted with about twice greater load as compared with the slider receiver 27; that is, a great operating force is applied to the operating shaft 25.

With the movement of the slider receiver 27, the slider piece 37 slides, in an elastic contact state, on the resistor and an unillustrated current collector on the insulating substrate 24, thereby changing the resistance value of the sensor of the present invention.

The change of the resistance value is sensed by an unillustrated control unit disposed on the EGR device side, to thereby regulate the amount of opening of the control valve 16 of the EGR device.

The guide section for guiding the operating shaft 25 within the casing 21 has been explained by referring to the structure in which the cruciform spring retaining portion 25b near the forward end of the arm 25c is guided by the cruciform guide section 33c which is formed continuously to the spring storing section 34 of the casing 21. However, it should be noticed that the guide structure for guiding the operating shaft 25 is not limited thereto and may be guide section of such a structure that, though not depicted, a part of the arm 25c of the operating 25 is guided by the guide groove 33.

In the embodiment of the present invention, the casing 21 has the opening 22 at the front side; the opening 22 is closed with the cover 23; also provided is the bearing 23a, on which the operating shaft 25 is supported. Similarly to a conventional example, the opening may be formed in the rear side of the casing and closed with a cover; and a bearing section may be provided on the casing side.

In the sensor of the present invention, the first return spring in elastic contact with the operating shaft and the second return spring in elastic contact with the slider receiver are disposed within the casing as described above; therefore it is possible to separately arrange the first return spring in elastic contact with the operating shaft and the second return spring in elastic contact with the slider receiver respectively. The spring force of the second return spring remains the same as the conventional one, while the spring force of the first return spring is increased to provide the operating shaft with a great operating force. It is, therefore, possible to cut off the supply of electric current to the solenoid of the EGR device, thereby enabling to restrict free movement of the valve rod in case a force to freely move the valve rod is exerted to the valve rod and accordingly to diminish wear of the slider piece. The present invention, therefore, can provide a long-life sensor.

Furthermore, because the spring force of the second return spring may be left unchanged, it is possible to provide an easy-to-operate sensor which insures smooth movement of the slider receiver in the casing.

Furthermore, the spring storing section for storing the first return spring is formed, within the casing, in a position equidistant from the axial center of the operating shaft. The operating shaft is provided with a pair of arms which are extended in a direction orthogonal with the axis of the operating shaft and are in elastic contact with the first return spring, and can be actuated with a great operating force. The present invention, therefore, can provide a sensor of good operability.

In the pair of arms the spring retaining portion is formed in a part which is in elastic contact with the first return spring, the end of which is retained at the spring retaining portion. Therefore it is possible to securely retain the first return spring, thereby enabling reliable transmission of the spring pressure of the first return spring to the operating shaft.

Furthermore, since the guide section for guiding movement of the operating shaft is formed within the casing, and the arm and/or spring retaining portion of the operating shaft is positioned in the guide section, it is also possible to provide a sensor of good operability which insures reliable guide of the operating shaft within the casing and smooth movement of the operating shaft.

Furthermore, since the spring retaining portion of the operating shaft is formed cruciform and the spring retaining portion is positioned in a cruciform guide section formed continuously to the spring storing section of the casing, the operating shaft is guided further reliably by means of the cruciform spring retaining portion and the guide section. Furthermore a sensor of good operability can be provided.

What is claimed is:

1. A sensor comprising: a casing with an opening; a cover for closing said opening; a bearing section formed in said cover or said casing; an operating shaft supported on said bearing section and movable in the axial direction; a slider receiver which is in contact with said operating shaft positioned within said casing and is movable in parallel with the axis of said operating shaft in interlock with movement of said operating shaft; and a first return spring in elastic contact with said operating shaft and a second return spring in elastic contact with said slider receiver; said first return spring and said second return spring being disposed within said casing.

2. A sensor according to claim 1, wherein a spring storing section is formed within said casing for storing said first return spring in an equidistant position from the axial center of said operating shaft; and on said operating shaft a pair of arms are extended in a direction orthogonal with the axis of said operating shaft, for elastic contact with said first return spring.

3. A sensor according to claim 2, wherein said pair of arms have a spring retaining portion formed in a part in elastic contact with said first return spring, and the end of said first return spring is retained at said spring retaining portion.

4. A sensor according to claim 3, wherein a guide section for guiding movement of said operating shaft is formed within said casing; and in said guide section said arms and/or spring retaining portion of said operating shaft are positioned.

5. A sensor according to claim 3, wherein said spring retaining portion of said operating shaft is formed in the shape of a cross, and said spring retaining portion is positioned in a cruciform guide section formed continuously with the spring retaining portion of said casing.

* * * * *